United States Patent Office 3,674,515
Patented July 4, 1972

3,674,515
METALIZING COMPOSITION INCLUDING
DEGASSED PLATINUM POWDERS
Denis G. Kelemen, Wilmington, Del., assignor to E. I. du Pont de Nemours and Company, Wilmington, Del.
No Drawing. Original application Mar. 27, 1968, Ser. No. 716,357, now Patent No. 3,511,640, dated May 12, 1970. Divided and this application Jan. 30, 1970, Ser. No. 7,230
Int. Cl. H01b 1/02; C09d 5/24
U.S. Cl. 106—1
3 Claims

ABSTRACT OF THE DISCLOSURE

A process of preparing degassed platinum powders comprising mixing finely divided platinum powder with at least an equal volume of a diluent metal oxide powder, heating the powder mixture for a sufficient time to dissipate substantially all gases from the platinum powder, cooling the powder mixture and separating the platinum powder from the diluent. The degassed platinum powders are particularly suitable for application to "green" ceramic sheets employed in the production of monolithic multilayer ceramic circuit components.

CROSS-REFERENCE TO RELATED APPLICATIONS

This is a division of S.N. 716,357, filed Mar. 27, 1968 now Pat. No. 3,511,640.

BACKGROUND OF THE INVENTION

Monolithic multi-layer ceramic capacitors and multilayer ceramic circuit boards have generally been prepared from thin preformed sheets or strips of "green" ceramic dielectric material which consists of finely divided ceramic dielectric material and a temporary binder. Such sheets are first coated, e.g., by screen stencilling with a metal paste in a desired pattern. Then the sheets are stacked to provide alternate dielectric and conductive (electrode) layers. In the case of capacitors, alternate electrode layers are exposed on opposite edges of the stack. In both cases, the stack is compressed under a pressure of about 100-2000 p.s.i., then fired to provide the monolithic multi-layer circuit structure. Such multi-layer boards and procedures of preparing same are described by Schwartz et al., "Laminated Ceramics," Institute of Electrical and Electronics Engineers, Inc., Proceedings 1967 Electronic Component Conference. This publication relates to multi-layer boards having conductor patterns of refractory metals, which must be fired in a reducing atmosphere, and boards having conductor patterns of palladium which are incompatible with ceramics fired over 1500° C.

More recently, demands for capacitors and multi-layer devices having improved electrical properties have made it necessary to employ as the dielectric, materials which must bt fired or sintered at temperatures in excess of the melting point of palladium. The selection and use of noble metal powders such as platinum and platinum alloys having melting points in excess of 1500° C. do not always produce electrical devices of high quality due to bubbling in the metallization areas. Also, curling, cracking and the deformation of "green" ceramic dielectric sheets has been observed after the firing of the assembled stacks.

Experience has shown that platinum powders precipitated from aqueous solutions of their compounds contain substantial quantities of certain gases, particularly hydrogen, nitrogen and oxygen. It is the presence of these gases in the platinum powders which, upon firing the "green" multi-layer stacks, causes bubbling, blistering and delamination of the monolithic structure. Thus, there is an obvious need for a process to produce improved noble metal powders which do not cause such undesirable effects.

SUMMARY OF THE INVENTION

The present invention relates to the degassing of platinum powders by the elimination of dissolved or otherwise occluded gases by high temperature annealing, without the simultaneous occurrence of sintering which would render the precious metal powder unsuitable for applications requiring finely divided platinum particles. Briefly, it has been found that degassing without sintering can be accomplished by annealing the platinum powder when it is mixed with a non-reactive diluent metal oxide from which it can be separated after the annealing process.

Generally, the process of preparing degassed platinum powders comprises: (a) mixing a desired quantity of finely divided platinum powder with an inert metal oxide powder, said oxide comprising, in volume, at least 50% of the platinum/inert metal oxide powder mixture, (b) heating (annealing) the powder mixture to a temperature within the range of 1000–1800° C., for a sufficient time to dissipate substantially all gases from the platinum powder, (c) cooling the powder mixture and (d) separating the platinum power from the inert metal oxide powder (e.g., by dissolving the oxide powder after annealing). Additionally, metalizing compositions comprising the degassed platinum powders are also part of this invention and can be utilized in the production of electronic components, particularly as conductors in multi-layer ceramic circuit structures.

DESCRIPTION OF THE PREFERRED EMBODIMENTS

A preferred process of preparing degassed platinum powders comprises: (a) mixing a desired quantity of finely divided platinum powder with an inert metal oxide powder selected from the group consisting of MgO, CaO, BaO, SrO, ZnO, and mixtures thereof, said oxide comprising, in volume, at least 50% of the platinum/inert metal oxide powder mixture; (b) heating the powder mixture to a temperature within the range of 1000–1800° C., for a sufficient time to dissipate substantially all dissolved, absorbed, adsorbed or otherwise occluded gases from the platinum powder; (c) cooling the powder mixture; and (d) separating the platinum powder from the inert metal oxide powder by dissolving the oxide powder with an acid selected from the group consisting of hydrochloric acid, sulphuric acid, nitric acid and acetic acid.

The term "platinum powder" is intended to include any metallic powder or metallic alloy powder which contains platinum. Physical mixtures of platinum with any other metal, an alloy containing platinum or mixtures thereof are encompassed. The "degassed" refers to the absence of substantially all gases, particularly hydrogen, nitrogen and oxygen, which may have been dissolved, absorbed, adsorbed or otherwise occluded on or in the platinum powder.

The first step of the process requires mixing the finely divided platinum powder with an inert metal oxide powder. The oxide powder, which is inert with respect to the platinum powder, acts as a diluent to separate the particles of platinum so that no sintering or agglomeration occurs during the heating or annealing step. Ideally, each platinum particle should be separated from other platinum particles by particles of the diluent to prevent any agglomeration of platinum particles. Therefore, at least 50% by volume of the inert metal oxide powder must be present to provide sufficient separation between the particles of platinum. A preferred amount of diluent is within the range of 60–90% by volume of the platinum/diluent mixture. Also, the platinum and diluent should be thoroughly mixed so that adequate separation of the platinum particles is provided.

The criteria for the inert metal oxide powder is that said powder must have a higher melting point than the temperature at which the platinum powder is to be annealed and degassed. For example, if the platinum powder is to be degassed at 1600° C., the inert metal oxide powder should have a melting point above this temperature so that it does not melt or become fused together with the platinum particles when heating (annealing) and degassing. In addition, the inert metal oxide powder must be able to be dissolved so that the platinum powder and the inert metal oxide can be separated. Generally, any inert refractory metals which can be easily separated by dissolution in acids are operable for purposes of this invention. Typical oxides include MgO, CaO, BaO, SrO, ZnO, CoO, NiO and mixtures thereof.

The particle size of the platinum is generally within the range of from 0.01–10 microns, which is sufficiently finely divided to pass through a 325 (U.S. Standard Sieve Scale) stencil screen. The inert metal oxide powder should be of comparable size or smaller in size to provide a uniform mixture so that the platinum particles remain separated from each other.

The second step of the process is directed to heating or annealing the powder mixture at a temperature within the range of 1000–1800° C. This temperature range was selected since temperatures within this range are used to fire multi-layer ceramic bodies. The temperature at which this heating step is carried out is determined by the temperature at which the platinum powders will ultimately be fired in the preparation of multi-layer ceramic bodies. Therefore, any particular temperature within this range is not critical but is only dependent upon the ultimate use of the finely divided platinum powder. In this way, all gases which would normally be expelled during the firing operation in preparing multi-layer ceramic circuit boards are driven off prior to firing by this heating (annealing) process step. Of course, temperatures below 1000° C. or above 1800° C. may be utilized if desirable or necessary for particular uses (e.g., multi-layer boards, buried conductors, etc.) of the platinum powder. However, for purposes of this invention, the above recited temperature range is preferred.

The length of time that the heating step is carried out is not critical. The main purpose is to drive off the gases which are adsorbed or occluded in the platinum powder. Therefore, the heating time is a sufficient time to dissipate substantially all gases from the platinum powder, regardless of whether they be adsorbed or otherwise occluded gases.

The third step is merely a cooling step. Generally, ambient room temperature is sufficient cooling, but any temperature above or below room temperature are within the scope of this invention.

The final step involves separating the platinum powder from the inert metal oxide powder, preferably by solution of the latter. This can be conveniently accomplished by the use of an acid which will dissolve the metal oxide powder but not the platinum powder. Exemplary acids include hydrochloric acid, sulphuric acid, nitric acid, acetic acid and trichloro-acetic acid, particularly when MgO is the oxide used.

The invention is illustrated by the following examples.

EXAMPLE 1

Ten grams of coarse platinum powder (1–2 microns) and 5 grams of magnesium oxide powder (0.5–5 microns) were introduced into a glass jar and thoroughly mixed by shaking the jar until a uniform mixture of powders was achieved. In volume percent, the MgO consisted of 73% and the platinum powder consisted of 27%. The mixed powders were then placed in an alumina crucible and heat treated to 1600° C. in a gas-fired air furnace, in approximately 3 hours. This mixture was allowed to cool to room temperature. The resultant solid mass was broken up in a mortar and pestle and introduced into a beaker containing 200 cc. of water and 600 cc. of 36% hydrochloric acid. This mixture was allowed to stand for several hours and then the liquid was decanted. The HCl treatment was repeated two more times and the remaining platinum powder was washed with water until a neutral pH was reached. After the platinum powder was dried, a printing paste was prepared by admixing 4 parts of the finely divided platinum powder with 1 part of an inert vehicle which consisted of 8% ethyl cellulose and 92% beta-terpineol. The paste was screen printed onto a "green" alumina ceramic tape (1 inch square) in the form of a conductor pattern. A similar piece of alumina tape was placed on top of the printed substrate and laminated into a buried conductor configuration by applying pressure. This multi-layer body was then fired to 1600° C., with a rise time of 7 hours. The resulting monolithic multi-layer body showed no evidence of bubbling in the area of the buried conductor metal pattern.

A multi-layer ceramic body was prepared in accordance with the above-described procedure except that untreated, (not degassed) platinum powder was utilized. During the firing of the multi-layer body, the untreated platinum powder displayed severe bubbling and the substrate curled and blistered.

Vacuum fusion analyses and surface area determinations were performed on both the degassed and untreated platinum powders used in Example 1. The results are reported in Table I.

TABLE I.—GAS CONTENT OF COARSE PLATINUM POWDER

| Heat treatment, temperature | Gases removed by vacuum fusion, relative NTP volumes [1] | | | | Surface area, m.²/g. |
| --- | --- | --- | --- | --- | --- |
| | O₂ | N₂ | H₂ | Total | |
| None | 5.8 | 32 | 31 | 68.8 | 0.3 |
| 700° C | 2.4 | 6.3 | 1.2 | 9.9 | 0.2 |
| 1,200° C | 1.0 | 4.4 | 0.9 | 6.3 | 0.14 |
| 1,400° C | 0.5 | 2.5 | 0.7 | 3.7 | 0.16 |
| 1,600° C | 0.0 | 0.2 | 0.5 | 0.7 | 0.18 |

[1] Total gas measured by vacuum fusion less calculated absorbed gases, assuming monomolecular oxygen layer present on all samples prior to vacuum fusion analysis. (Langmuir, Journal of American Chemical Society, vol. 40, p. 1,361 (1918), shows that Pt adsorbs oxygen preferentially when exposed to air.)

The removal of substantially all gases from the platinum powder is readily apparent from the above data. The above data demonstrate a 98 fold decrease in gas content by treating the platinum in accordance with the process of this invention.

EXAMPLE 2

A fine platinum powder (0.01–1 micron) was degassed in accordance with the method of Example 1. The resultant multi-layer ceramic body displayed no bubbling or blistering in the area of the metalization and displayed good substrate characteristics.

A fine platinum powder which was not degassed was used in the same process to prepare a monolithic multi-layer ceramic body. The conductor pattern exhibited bubbling and the substrate tended to curl and blister.

EXAMPLE 3

A platinum alloy powder containing 50% by weight of platinum, 25% by weight palladium and 25% by weight gold, having a particle size of 0.01–5 microns, was degassed and used to prepare a multi-layer body as described in Example 1. The resultant body showed no signs of bubbling, curling or blistering.

An alloy which was not degassed was utilized in the same process. In contrast, the results produced bubbling of the metalization and blistering of the substrate.

The degassed platinum powders of this invention can be used to prepare various metalizing compositions. In general, conductor compositions containing platinum or platinum alloy powders are most useful since the conductor patterns in multi-layer ceramic structures are the preferred utility for the degassed platinum or platinum alloy powders. However, this does not limit the scope of the invention and the degassed platinum or platinum alloy powders may also be used in various other metalizing compositions, resistor compositions and brazing compositions. The metalizing compositions, which contain the degassed platinum or platinum alloy powder, may be dispersed in an inert vehicle. Additionally, metalizing compositions can also contain a finely divided inorganic binder (e.g., glass, bismuth oxide, cerium oxide, etc.); for example, 4–99% by weight of the degassed platinum powder and 1–96% by weight of an inorganic binder may be dispersed in an inert vehicle. Any of the conventional components and proportions of ingredients are included in the metalizing composition of this invention. For example, see Hoffman, Ser. No. 506,986, filed Nov. 9, 1965 and now Pat. No. 3,385,799; Short, U.S. Pat. 2,819,170 and Larsen et al., U.S. Pat. 2,822,279.

In preparing the metalizing compositions, it is desirable, although not necessary, to disperse the solids in a vehicle. Any inert liquid may be utilized as a vehicle. Water or any one of various organic liquids, with or without thickening and/or stabilizing, and/or other common additives may be used. Examples of organic liquids that can be used are the aliphatic alcohols; esters of such alcohols, for example, the acetates and propionates; the terpenes, such as pine oil, alpha- and beta-terpineol and the like; solutions of resin such as polymethacrylates of lower alcohols, or solutions of ethyl cellulose, and solvents such as pine oil and the monobutyl ether of ethylene glycol monoacetate. The vehicles of copending application, Ser. No. 617,855, may also be used. The vehicle may contain or be composed of volatile liquids to promote fast setting after application; or it may contain waxes, thermoplastic resins or the like materials which are thermofluids so that the vehicle-containing composition may be applied at elevated temperatures to a relatively cold ceramic body upon which the composition sets immediately.

The proportions of inert vehicle:solids (platinum, glass, etc.) in the metalizing compositions of this invention may vary considerably depending upon the manner in which the paint or paste is to be applied and the kind of vehicle used. Generally, from 30–90% solids are dispersed and from 70–10% by weight of the inert liquid vehicle.

Since it is obvious that many changes and modifications can be made in the above-described details without departing from the nature and spirit of this invention, it is to be understood that the invention is not to be limited to said details except as set forth in the appended claims.

I claim:

1. A metalizing composition comprising a gas-free platinum powder dispersed in an inert liquid vehicle.
2. A metalizing composition in accordance with claim 1 which additionally contains an inorganic binder.
3. A metalizing composition according to claim 1 wherein said platinum powder is sufficiently finely divided to pass through a 325 stencil screen.

References Cited
UNITED STATES PATENTS

| 3,440,062 | 4/1969 | Hoffman | 106—1 |
|---|---|---|---|
| 3,450,545 | 6/1969 | Ballard et al. | 106—1 |
| 3,480,566 | 11/1969 | Hoffman | 106—1 |
| 3,484,284 | 12/1969 | Dates et al. | 106—1 |
| 3,497,384 | 2/1970 | Pirigyi | 106—1 |
| 3,502,489 | 3/1970 | Cole | 106—1 |

OTHER REFERENCES

Goetzel, C. G.: Treatise on Powder Metallurgy, vol. I, 1949, pp. 23–25.

L. DEWAYNE RUTLEDGE, Primary Examiner

W. W. STALLARD, Assistant Examiner

U.S. Cl. X.R.

75—0.5 R; 252—514